United States Patent
Koskela et al.

(10) Patent No.: US 11,405,867 B2
(45) Date of Patent: Aug. 2, 2022

(54) DETERMINING PDCCH MONITORING DURING ON-DURATION WHEN IN POWER SAVING MODE

(71) Applicant: Nokia Technologies Oy, Espoo (FI)

(72) Inventors: Timo Koskela, Oulu (FI); Jorma Kaikkonen, Oulu (FI); Sami Hakola, Kempele (FI); Jussi-Pekka Koskinen, Oulu (FI); Juha Karjalainen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 78 days.

(21) Appl. No.: 16/862,807

(22) Filed: Apr. 30, 2020

(65) Prior Publication Data

US 2020/0351786 A1    Nov. 5, 2020

Related U.S. Application Data

(60) Provisional application No. 62/842,224, filed on May 2, 2019.

(51) Int. Cl.
  *G08C 17/00* (2006.01)
  *H04W 52/02* (2009.01)
  *H04W 72/04* (2009.01)

(52) U.S. Cl.
  CPC ..... *H04W 52/0235* (2013.01); *H04W 72/042* (2013.01)

(58) Field of Classification Search
  None
  See application file for complete search history.

(56) References Cited

U.S. PATENT DOCUMENTS

2012/0213137 A1* 8/2012 Jeong ............... H04W 72/1289
                                                          370/311
2012/0230238 A1* 9/2012 Dalsgaard ......... H04W 74/0841
                                                          370/329
(Continued)

FOREIGN PATENT DOCUMENTS

WO    WO-2018/203822 A1    11/2018

OTHER PUBLICATIONS

"PDCCH-based power saving signal/channel", vivo, 3GPP TSG RAN WG1 #97, R1-1906170, May 2019, 10 pgs.

(Continued)

*Primary Examiner* — Clemence S Han
(74) *Attorney, Agent, or Firm* — Harrington & Smith

(57) ABSTRACT

In accordance with example embodiments of the invention there is at least a method and apparatus to perform determining by a user equipment that the user equipment has missed, or will miss, at least one power saving signal monitoring occasion, where the user equipment is configured to monitor a power saving signal in a first bandwidth part; and based upon the determination that the user equipment has missed, or will miss, the at least one power saving signal monitoring occasion, causing the user equipment to monitor a physical downlink control channel on the first bandwidth part during an on-duration of discontinuous reception. To perform configuring a user equipment to monitor a power saving signal in a first bandwidth part; causing the user equipment to monitor a physical downlink control channel on the first bandwidth part during an on-duration of discontinuous reception; and based upon the causing of the user equipment to monitor the physical downlink control channel on the first bandwidth part during the on-duration of discontinuous reception, causing the on-duration of discontinuous reception-cycle to be reduced relative to a previous on-duration of discontinuous recep- (Continued)

tion. And to perform determining by a user equipment that an inactivity timer has expired during an on-duration of discontinuous reception-cycle after a user equipment wake up has been triggered, where the user equipment is configured to report periodic channel status information (CSI) feedback on the on-duration of discontinuous reception-cycle and based upon the determination that the inactivity timer has expired during the on-duration of discontinuous reception-cycle after the user equipment wake up has been triggered, causing the user equipment to monitor a physical downlink control channel for the on-duration of discontinuous reception.

25 Claims, 6 Drawing Sheets

(56) References Cited

U.S. PATENT DOCUMENTS

| | | | | |
|---|---|---|---|---|
| 2017/0318620 | A1* | 11/2017 | Tseng | H04L 1/1812 |
| 2018/0145800 | A1* | 5/2018 | Srivastav | H04W 52/0229 |
| 2020/0029274 | A1* | 1/2020 | Cheng | H04B 17/309 |
| 2020/0037247 | A1* | 1/2020 | Liao | H04W 52/0219 |
| 2020/0107266 | A1* | 4/2020 | Liao | H04W 76/28 |
| 2020/0150736 | A1* | 5/2020 | Nam | G06F 1/325 |
| 2020/0178172 | A1* | 6/2020 | Thangarasa | H04W 52/02 |
| 2020/0195410 | A1* | 6/2020 | Li | H04W 76/28 |
| 2020/0245395 | A1* | 7/2020 | Zhang | H04L 5/0053 |
| 2020/0267643 | A1* | 8/2020 | Wu | H04L 5/0053 |
| 2020/0267645 | A1* | 8/2020 | Wu | H04W 36/06 |
| 2020/0351784 | A1* | 11/2020 | Tsai | H04L 5/0094 |
| 2020/0367160 | A1* | 11/2020 | Braun | H04W 80/08 |
| 2021/0195521 | A1* | 6/2021 | Muller | H04W 76/28 |
| 2021/0259044 | A1* | 8/2021 | Islam | H04W 52/0229 |
| 2022/0078879 | A1* | 3/2022 | Nimbalker | H04W 52/0235 |

OTHER PUBLICATIONS

"3$^{rd}$ Generation Partnership Project; Technical Specification Group Radio Access Network; NR; Study on UE Power Saving (Release 16)", 3GPP TR 3 8,840 V1.0.0, Mar. 2019, 70 pgs.

* cited by examiner

Components in PDCCH monitoring.

Illustration of a DRX cycle

Illustration of power saving signal/channel for wake up and PDCCH monitoring

810: determining by a user equipment that the user equipment has missed, or will miss, at least one power saving signal monitoring occasion, where the user equipment is configured to monitor a power saving signal in a first bandwidth part 820: based upon the determination that the user equipment has missed, or will miss, the at least one power saving signal monitoring occasion, causing the user equipment to monitor a physical downlink control channel on the first bandwidth part during an on-duration of discontinuous reception-cycle

FIG. 8

910: configuring a user equipment to monitor a power saving signal in a first bandwidth part 920: causing the user equipment to monitor a physical downlink control channel on the first bandwidth part during an on-duration of discontinuous reception-cycle 930: based upon the causing of the user equipment to monitor the physical downlink control channel on the first bandwidth part during the on-duration of discontinuous reception-cycle, causing the discontinuous reception On period to be reduced relative to a previous on-duration of discontinuous reception-cycle

FIG. 9

1010: determining by a user equipment that an inactivity timer has expired during an on-duration of discontinuous reception-cycle after a user equipment wake up has been triggered, where the user equipment is configured to report periodic channel status information (CSI) feedback on the on-duration of discontinuous reception-cycle 1020: based upon the determination that the inactivity timer has expired during the discontinuous reception On period after the user equipment wake up has been triggered, causing the user equipment to monitor a physical downlink control channel for the on-duration of discontinuous reception-cycle

FIG. 10

DETERMINING PDCCH MONITORING DURING ON-DURATION WHEN IN POWER SAVING MODE

CROSS-REFERENCE TO RELATED APPLICATIONS

The present application claims the benefit under 35 USC 119(e) of U.S. Provisional application No. 62/842,224, filed on May 2, 2019, the disclosure of which is incorporated by reference herein in its Entirety.

TECHNICAL FIELD

The example and non-limiting embodiments relate generally to signal monitoring and power saving used in wireless communications and, more particularly, to signal monitoring during a power saving mode.

The following abbreviations that may be found in the specification and/or the drawing figures are defined as follows:

3GPP third generation partnership project
5G fifth generation
5GC 5G core network
AMF access and mobility management function
BWP Bandwidth Part
CORESET Control Resource Set
CU central unit
C-RNTI Cell Radio Network Temporary Identifier
DCI downlink control information
DRX Discontinuous Reception
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
GTS Go-To-Sleep
I/F interface
LTE long term evolution
MAC medium access control
MME mobility management entity
ng or NG new generation
ng-eNB or NG-eNB new generation eNB
NR new radio
N/W or NW network
PDCCH Physical Downlink Control Channel
PDCP packet data convergence protocol
PHY physical layer
PS-RNTI Radio Network Temporary Identifier for Power Saving
RAN radio access network
Rel release
RLC radio link control
RNTI Radio Network Temporary Identifier
RRH remote radio head
RRC radio resource control
RU radio unit
Rx receiver
SDAP service data adaptation protocol
SGW serving gateway
SMF session management function
TS technical specification
Tx transmitter
UE user equipment (e.g., wireless, typically mobile device)
UPF user plane function
WID work item description
WUS wake-up signal

BACKGROUND

UE Power Saving was approved by standards bodies and one objective is to specify the UE power saving techniques with UE adaption in achieving UE power saving. These power saving technique should address latency and performance in NR as well as network impact.

Example embodiments of the invention as disclosed herein work to improve operations associated with at least these techniques.

SUMMARY

In an example aspect of the invention, there is an apparatus, such as a network side apparatus, comprising at least one memory including computer program code, wherein the at least one memory including the computer program code is configured with the at least one processor to cause the apparatus to: determine by a user equipment that the user equipment has missed, or will miss, at least one power saving signal monitoring occasion, where the user equipment is configured to monitor a power saving signal in a first bandwidth part; and based upon the determination that the user equipment has missed, or will miss, the at least one power saving signal monitoring occasion, cause the user equipment to monitor a physical downlink control channel on the first bandwidth part during an on-duration of discontinuous reception-cycle.

In another example aspect of the invention, there is a method comprising: determining by a user equipment that the user equipment has missed, or will miss, at least one power saving signal monitoring occasion, where the user equipment is configured to monitor a power saving signal in a first bandwidth part; and based upon the determination that the user equipment has missed, or will miss, the at least one power saving signal monitoring occasion, causing the user equipment to monitor a physical downlink control channel on the first bandwidth part during an on-duration of discontinuous reception-cycle.

A further example embodiment is a method comprising the method of the previous paragraph, there is based upon the causing of the user equipment to monitor a physical downlink control channel on the first bandwidth part during the on-duration of discontinuous reception-cycle, causing the on-duration of discontinuous reception-cycle to be reduced, there is before causing the user equipment to monitor the physical downlink control channel on the first bandwidth part during the on-duration of discontinuous reception-cycle, the user equipment monitoring the physical downlink control channel on a second bandwidth part, and switching the monitoring of the physical downlink control channel from the second bandwidth part to the first bandwidth part based upon: a physical downlink control channel trigger, or a discontinuous reception inactivity-timer, or a bandwidth part inactivity timer, where the user equipment is caused to monitor the physical downlink control channel on the first bandwidth part during the on-duration of discontinuous reception-cycle based, at least partially, upon the switching of the monitoring of the physical downlink control channel from the second bandwidth part to the first bandwidth part, where monitoring the power saving signal comprises monitoring of a downlink control information format with at least one of a Cell Radio Network Temporary Identifier, a Radio Network Temporary Identifier for power saving, or a group common Radio Network Temporary Identifier for power saving.

A non-transitory computer-readable medium storing program code, the program code executed by at least one processor to perform at least the method as described in the paragraphs above.

In another example aspect of the invention, there is an apparatus comprising: means for determining by the apparatus that the apparatus has missed, or will miss, at least one power saving signal monitoring occasion, where the apparatus is configured to monitor a power saving signal in a first bandwidth part; and means, based upon the determination that the apparatus has missed, or will miss, the at least one power saving signal monitoring occasion, for causing the apparatus to monitor a physical downlink control channel on the first bandwidth part during an on-duration of discontinuous reception-cycle.

In accordance with the example embodiments as described in the paragraph above, at least the means for determining and causing comprises a network interface, and computer program code stored on a computer-readable medium and executed by at least one processor.

A further example embodiment is an apparatus comprising the apparatus of the previous paragraphs, where the at least one memory and the computer program code are configured to, with the at least one processor, cause the apparatus to: based upon the causing of the apparatus to monitor a physical downlink control channel on the first bandwidth part during the on-duration of discontinuous reception-cycle, cause the on-duration of discontinuous reception-cycle to be reduced, where the at least one memory and the computer program code are configured to, with the at least one processor, cause the apparatus to: before causing the apparatus to monitor the physical downlink control channel on the first bandwidth part during the on-duration of discontinuous reception-cycle, the apparatus monitoring the physical downlink control channel on a second bandwidth part, and switching the monitoring of the physical downlink control channel from the second bandwidth part to the first bandwidth part based upon: a physical downlink control channel trigger, or a discontinuous reception inactivity-timer, or a bandwidth part inactivity timer, where the at least one memory and the computer program code are configured to, with the at least one processor, cause the apparatus to: monitor the physical downlink control channel on the first bandwidth part during the on-duration of discontinuous reception-cycle based, at least partially, upon the switching of the monitoring of the physical downlink control channel from the second bandwidth part to the first bandwidth part, where monitoring the power saving signal comprises monitoring of a downlink control information format with at least one of a Cell Radio Network Temporary Identifier, a Radio Network Temporary Identifier for power saving, or a group common Radio Network Temporary Identifier power saving.

In another example aspect of the invention, there is a non-transitory program storage device readable by a machine, tangibly embodying a program of instructions executable by the machine for performing operations, the operations comprising: determining by a user equipment that the user equipment has missed, or will miss, at least one power saving signal monitoring occasion, where the user equipment is configured to monitor a power saving signal in a first bandwidth part; and based upon the determination that the user equipment has missed, or will miss, the at least one power saving signal monitoring occasion, causing the user equipment to monitor a physical downlink control channel on the first bandwidth part during an on-duration of discontinuous reception-cycle.

A further example embodiment is an apparatus comprising the non-transitory program storage device readable by a machine of the previous paragraphs, where the operations further comprise, based upon the causing of the user equipment to monitor a physical downlink control channel on the first bandwidth part during the on-duration of discontinuous reception-cycle, causing the on-duration of discontinuous reception-cycle to be reduced, where the operations further comprise, before causing the user equipment to monitor the physical downlink control channel on the first bandwidth part during the on-duration of discontinuous reception-cycle, the user equipment monitoring the physical downlink control channel on a second bandwidth part, and switching the monitoring of the physical downlink control channel from the second bandwidth part to the first bandwidth part based upon: a physical downlink control channel trigger, or a discontinuous reception inactivity-timer, or a bandwidth part inactivity timer, and/or where the operations further comprise, the user equipment is caused to monitor the physical downlink control channel on the first bandwidth part during the on-duration of discontinuous reception-cycle based, at least partially, upon the switching of the monitoring of the physical downlink control channel from the second bandwidth part to the first bandwidth part, where monitoring the power saving signal comprises monitoring of a downlink control information format with at least one of a Cell Radio Network Temporary Identifier, a Radio Network Temporary Identifier for power saving, or a group common Radio Network Temporary Identifier for power saving.

In another example embodiment of the invention there is an apparatus, such as a user equipment apparatus, comprising at least one memory including computer program code, wherein the at least one memory including the computer program code is configured with the at least one processor to cause the apparatus to: configure the apparatus to monitor a power saving signal in a first bandwidth part; cause the apparatus to monitor a physical downlink control channel on the first bandwidth part during an on-duration of discontinuous reception-cycle; and based upon the causing of the apparatus to monitor the physical downlink control channel on the first bandwidth part during the on-duration of discontinuous reception-cycle, cause the on-duration of discontinuous reception-cycle to be reduced relative to a previous on-duration of discontinuous reception-cycle.

In another example aspect of the invention, there is a method comprising: configuring a user equipment to monitor a power saving signal in a first bandwidth part; causing the user equipment to monitor a physical downlink control channel on the first bandwidth part during an on-duration of discontinuous reception-cycle; and based upon the causing of the user equipment to monitor the physical downlink control channel on the first bandwidth part during the on-duration of discontinuous reception-cycle, causing the on-duration of discontinuous reception-cycle to be reduced relative to a previous on-duration of discontinuous reception-cycle.

A non-transitory computer-readable medium storing program code, the program code executed by at least one processor to perform at least the method as described in the paragraphs above.

In another example aspect of the invention, there is a non-transitory program storage device readable by a machine, tangibly embodying a program of instructions executable by the machine for performing operations, the operations comprising: configuring a user equipment to monitor a power saving signal in a first bandwidth part; causing the user equipment to monitor a physical downlink control channel on the first bandwidth part during an on-duration of discontinuous reception-cycle; and based upon the causing of the user equipment to monitor the physical downlink control channel on the first bandwidth part during the on-duration of discontinuous reception-cycle, causing the on-duration of discontinuous reception-cycle to be reduced relative to a previous on-duration of discontinuous reception-cycle.

In still another example aspect of the invention, there is an apparatus comprising: means for configuring the apparatus to monitor a power saving signal in a first bandwidth part; means for causing the apparatus to monitor a physical downlink control channel on the first bandwidth part during an on-duration of discontinuous reception-cycle; and based upon the causing of the apparatus to monitor the physical downlink control channel on the first bandwidth part during the on-duration of discontinuous reception-cycle, means for causing the on-duration of discontinuous reception-cycle to be reduced relative to a previous on-duration of discontinuous reception-cycle.

In accordance with the example embodiments as described in the paragraph above, at least the means for configuring and causing comprises a network interface, and computer program code stored on a computer-readable medium and executed by at least one processor.

In another example aspect of the invention, there is an apparatus comprising: at least one processor; and at least one non-transitory memory including computer program code, the at least one memory and the computer program code configured to, with the at least one processor, cause the apparatus to: determine by the apparatus that an inactivity timer has expired during an on-duration of discontinuous reception-cycle after an apparatus wake up has been triggered, where the apparatus is configured to report periodic channel status information (CSI) feedback on the on-duration of discontinuous reception-cycle; and based upon the determination that the inactivity timer has expired during the on-duration of discontinuous reception-cycle after the apparatus wake up has been triggered, cause the apparatus to monitor a physical downlink control channel for the on-duration of discontinuous reception-cycle.

In another example aspect of the invention, there is a method comprising: determining by a user equipment that an inactivity timer has expired during an on-duration of discontinuous reception-cycle after a user equipment wake up has been triggered, where the user equipment is configured to report periodic channel status information (CSI) feedback on the on-duration of discontinuous reception-cycle; and based upon the determination that the inactivity timer has expired during the on-duration of discontinuous reception-cycle after the user equipment wake up has been triggered, causing the user equipment to monitor a physical downlink control channel for the on-duration of discontinuous reception-cycle.

A non-transitory computer-readable medium storing program code, the program code executed by at least one processor to perform at least the method as described in the paragraphs above.

In another example aspect of the invention, there is a non-transitory program storage device readable by a machine, tangibly embodying a program of instructions executable by the machine for performing operations, the operations comprising: determining by a user equipment that an inactivity timer has expired during an on-duration of discontinuous reception-cycle after a user equipment wake up has been triggered, where the user equipment is configured to report periodic channel status information (CSI) feedback on the on-duration of discontinuous reception-cycle; and based upon the determination that the inactivity timer has expired during the on-duration of discontinuous reception-cycle after the user equipment wake up has been triggered, causing the user equipment to monitor a physical downlink control channel for the on-duration of discontinuous reception-cycle.

In another example aspect of the invention, there is an apparatus comprising: means for determining by the apparatus that an inactivity timer has expired during an on-duration of discontinuous reception-cycle after an apparatus wake up has been triggered, where the apparatus is configured to report periodic channel status information (CSI) feedback on the on-duration of discontinuous reception-cycle; and means, based upon the determination that the inactivity timer has expired during the on-duration of discontinuous reception-cycle after the apparatus wake up has been triggered, for causing the apparatus to monitor a physical downlink control channel for the on-duration of discontinuous reception-cycle.

In accordance with the example embodiments as described in the paragraph above, at least the means for determining and causing comprises a network interface, and computer program code stored on a computer-readable medium and executed by at least one processor.

A communication system comprising a network side apparatus and a user equipment side apparatus performing operations as described above.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 8, FIG. 9, and FIG. 10 each show a method in accordance with example embodiments of the invention which may be performed by an apparatus.

DETAILED DESCRIPTION

Figure 1:
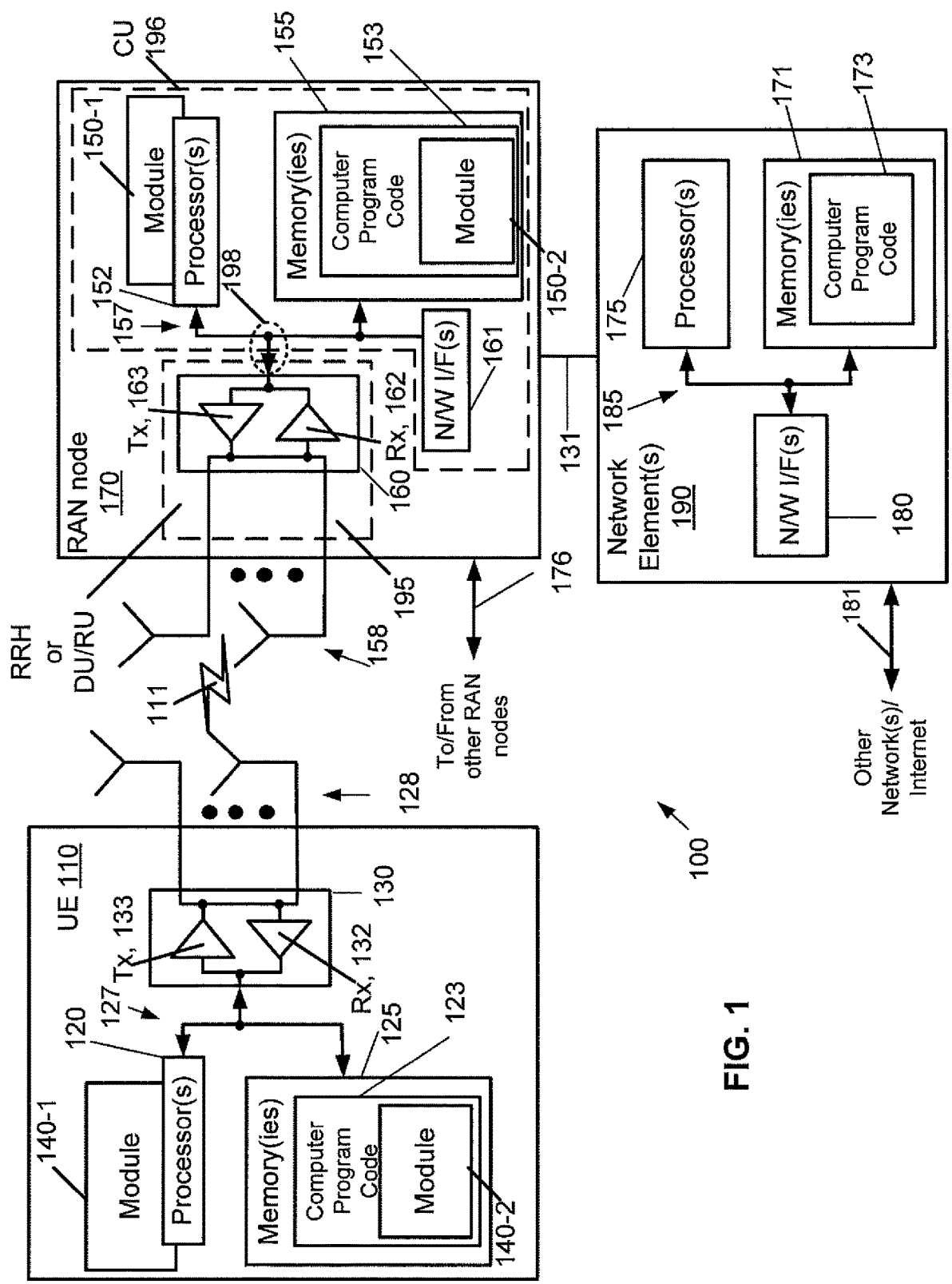
FIG. 1 shows a high level block diagram of various devices used in carrying out various aspects of the invention.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs or base stations, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein generally relate to a power saving signal to be used for wake-up purposes, and the wake up signal is monitored only outside of a UE active time.

A UE Power Saving WID (Work Item Description) was approved in RAN #83 (RAN1 WID for UE Power Saving). The objectives included to specify the UE power saving techniques with UE adaption in achieving UE power saving. The power saving technique was indicated to address latency and performance in NR as well as network impact.

The objective of the UE power saving includes the following:
1) Specify power saving techniques with UE adaptation with focus in RRC_CONNECTED mode [RAN1, RAN4]
   a) Specify the power saving techniques with power saving signal/channel
      i) Specify the Physical Downlink Control Channel (PDCCH)-based power saving signal/channel triggering UE adaptation in RRC_CONNECTED
      ii) Note: this objective shall not duplicate DRX operation and impact to DRX is studied at RAN2
      iii) Note: Any change of PDCCH channel coding and payload interleaver is not in the scope
   b) Specify the procedure of cross-slot scheduling power saving techniques
      i) Note: The procedure is in addition to Rel-15 cross-slot scheduling procedure
2) Evaluate the required switching and interruption times for UE dynamic adaptation to the maximum number of MIMO layers [RAN4]
   a) Note: Switching on/off the RF is part of the evaluation These objectives are RAN1/RAN4 focus and do not consider RAN2 impact. The objectives are subject to further update in RAN #84. The update will be based on recommendations from the completion of RAN2 study and remaining RAN1 recommendations based on the conclusion of RAN1 study.

Figure 2:
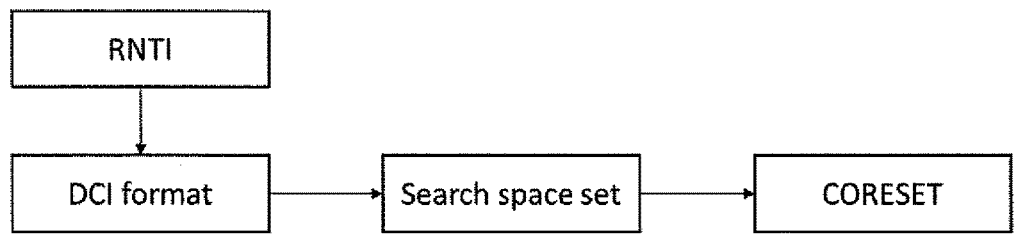
FIG. 2 shows components in PDCCH monitoring.
Figure 3:
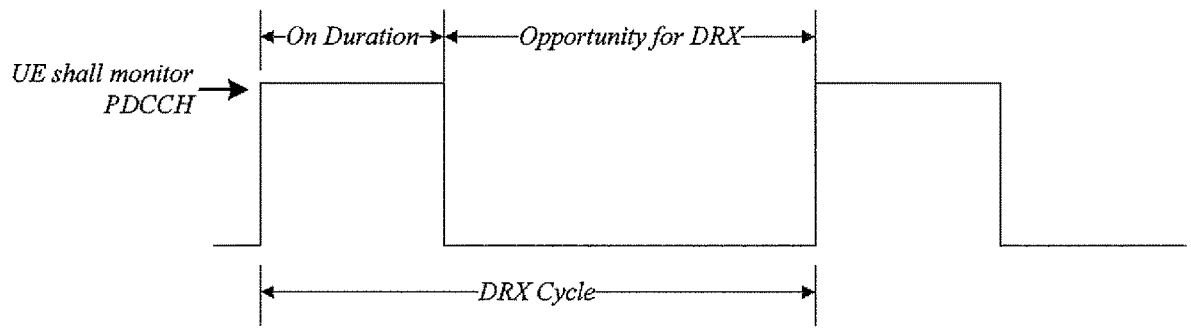
FIG. 3 shows an illustration of a DRX cycle.

In regard to Physical Downlink Control Channel (PDCCH) monitoring, such as described in 3GPP Release 15 for example, main components in PDCCH monitoring comprise control resource set (CORESET) configuration for determining time and frequency resources for control-channel elements (CCEs), search space set configuration for determining how and when a UE monitors PDCCH, Downlink Control Information (DCI) format (part of search space set configuration) for determining signaled information and Radio Network Temporary Identifier (RNTI) for addressing the information to the certain UE(s), as illustrated in FIG. 2 (arrow shows the association direction).

For Discontinuous Reception (DRX) configuration in NR, such as described in 3GPP TS 38.300 for example, when DRX is configured, the UE does not have to continuously monitor PDCCH. DRX is characterized by the following:
  on-duration: duration that the UE waits for, after waking up, to receive PDCCHs. If the UE successfully decodes a PDCCH, the UE stays awake and starts the inactivity timer;
  inactivity-timer: duration that the UE waits to successfully decode a PDCCH, from the last successful decoding of a PDCCH, failing which it can go back to sleep. The UE may restart the inactivity timer following a single successful decoding of a PDCCH for a first transmission only (i.e. not for retransmissions);
  retransmission-timer: duration until a retransmission can be expected;

cycle: specifies the periodic repetition of the on-duration followed by a possible period of inactivity;

active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

In regard to a Physical Downlink Control Channel (PDCCH) power saving signal, a new signal or channel has been agreed to be specified in NR Release 16 for power saving purposes. In one realization the signal/channel is configured together with DRX configuration, and presence of the signal/channel determines whether the UE is required to monitor PDCCH (according to normal search space configuration) during the On-Duration. In one example implementation the PDCCH power saving signal/channel may indicate that the UE is required to monitor PDCCH during on-duration (referred also as wake up signal) or alternatively it may indicate than UE is not required to monitor PDCCH during On-Duration (referred also as Go-to-sleep or GTS).

Additionally, the power saving signal/channel may be used to adapt the UE configuration for power saving purposes during On-Duration when the UE is required to monitor PDCCH according to a search space configuration. Power saving signal/channel may indicate further adaptation of different parameters for UE power saving such as modify periodicity of PDCCH search spaces/number of CORESETs, etc. In some aspects it may be configured to indicate to the UE that it is allowed to skip monitoring of PDCCH for a specific number of slots or for specific time duration.

Figure 4:
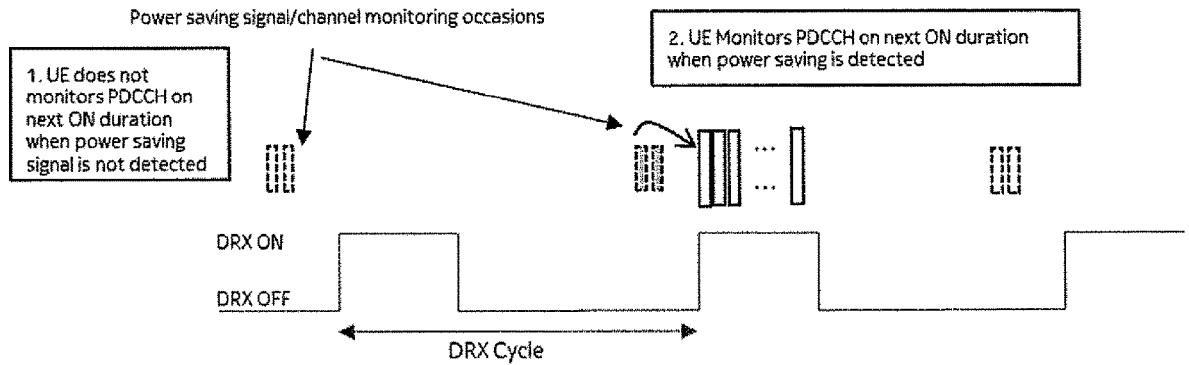
FIG. 4 shows an illustration of a power saving signal/channel for wake-up and PDCCH monitoring.

An example illustration of power saving signal/channel for wake-up purposes is shown in FIG. 4. In this configuration the power saving signal/channel may be monitored prior to the on-duration of the DRX cycle and when the UE is not in active time (i.e. it is assumed that UE would not monitor PDCCH based wake up signal/channel when it is on active time).

In Step 1 shown in FIG. 4 the UE does not detect transmission of a power saving signal/channel and it does not monitor PDCCH on the next ON-duration.

In Step 2 shown in FIG. 4 the UE detects power saving signal addressed to it and monitors PDCCH on the next ON-duration.

There may be an offset or specific time between the power saving monitoring occasion (or occasions) and the corresponding ON-duration (e.g. next ON-duration after the monitoring occasion(s)). Monitoring occasion or occasions (or slots/symbols where/when power saving signal or channel is monitored) may be, in some cases, referred as a monitoring window. In some cases, a monitoring window (a time window) may determine when a search space for monitoring a power saving signal or channel (e.g. a specific DCI format) is active. In other cases, the UE may be configured with a search space for monitoring a power saving signal or channel without a specific time window such as, for example, if the search space configuration determines implicitly the time window for monitoring the power saving signal.

Although the FIG. 4 illustrates the power saving channel for wake-up purposes, a Go-To-Sleep (GTS) may operate in an opposite manner i.e. in step 1 due to absence of the channel (absence of network indication) UE would monitor PDCCH and in step 2 UE would not monitor PDCCH according to search space configuration. GTS generally means that network indicates that the UE is not required to monitor PDCCH or the UE may go from active time to non-active time.

In a related agreement in power saving feature lead (R1-1905791, Summary of PDCCH-based Power Saving Signal/Channel), the DCI content is considered to cover following functionality. Potential DCI contents in DCI format(s), to be further investigated:

Power saving technique associated with C-DRX (Connected Mode DRX)—
  For UE function for the C-DRX
    Wakeup—
      UE is indicated to transition from outside Active Time to Active Time
      UE is indicated to stay at Active Time
    Go to sleep—
      UE is indicated to transition from Active Time to outside Active Time.
      UE is indicated to stay outside Active Time
      FFS: The time of receiving the wake-up and go-to-sleep indication inside or outside Active Time.

As a further example, a PDCCH based Power saving signal/channel may be monitored using dedicated CORESET/SS (Control Resource Set/Search Space) configuration where the UE is configured with dedicated CORESET for PDCCH power saving signal/channel for monitoring power save DCI format on a dedicated search space. Alternatively, an existing CORESET may be configured with search space associated with special DCI format for power saving. The UE may monitor the special DCI format with its own C-RNTI, dedicated special RNTI for power saving (PS-RNTI) or group common PS-RNTI. In yet another alternative way to configure power saving signal monitoring for the UE is to use specific Bandwidth Part (BWP) with a CORESET configuration associated with search space for monitoring DCI format for power save (referred as DCI-PS).

An example of Bandwidth Part (BWP) operation is described in 3GPP TS 38.321 Chapter 5.15. In addition to clause 12 of 3GPP TS 38.213, this subclause specifies requirements on BWP operation. A Serving Cell may be configured with one or multiple BWPs, and the maximum number of BWP per Serving Cell may be as specified in 3GPP TS 38.213.

The Bandwidth Part (BWP) switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure.

Features as described herein may be used in regard to cases where there may be ambiguity whether a power saving signal was transmitted and the UE was not able to receive it, or if the specific monitoring occasion was overlapped with other UE activities.

As an example, a UE may enter DRX (stop PDCCH monitoring) after expiry of an inactivity-timer. During the power saving signal channel monitoring occasions, the UE may change BWP to monitor a power saving signal or a channel on another BWP that is different than the current BWP used for monitoring PDCCH according to search space (SS) configuration. Features as described herein may be used regarding how the network and the UE stay synchronized in these cases.

Figure 5:
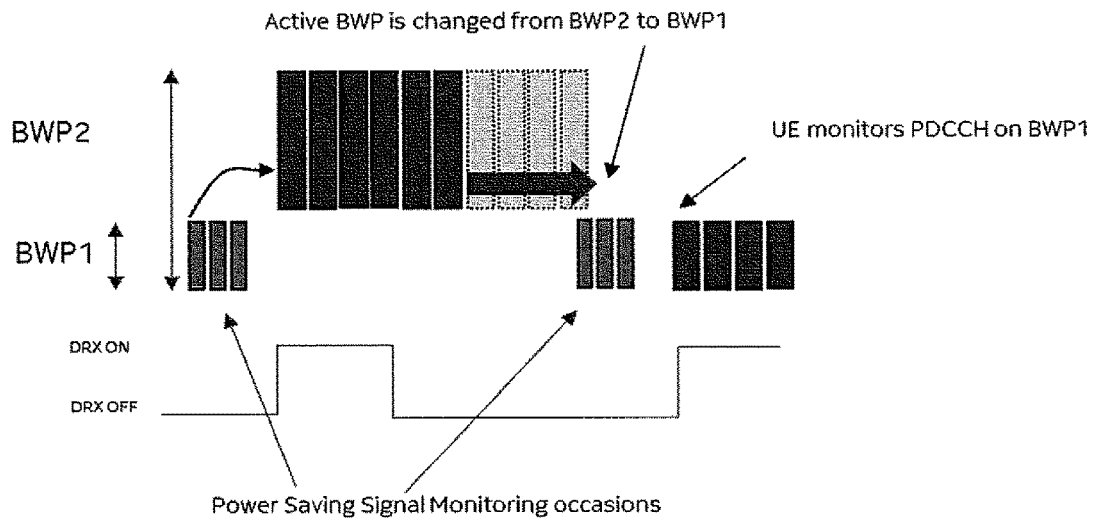
FIG. 5 shows power saving monitoring occasions.

In one example, when the UE monitors a power saving signal in another BWP (i.e. BWP1 has power saving signal or channel configured) than is currently used for PDCCH monitoring according to the search space configuration (i.e. BWP2), and the UE switches to the BWP1 (such as due to a PDCCH trigger or a DRX inactivity-timer or a bwp-InactivityTimer for example) and the UE determines that it has missed, or will miss, at least one power saving signal monitoring occasion, the UE may monitor PDCCH on the current BWP1 as illustrated by FIG. 5 on the on-Duration (DRX ON) corresponding to the missed power saving signal monitoring occasion. In one example, a monitoring occasion may comprise of at least one slot where UE would be monitoring power saving signal or channel. In reference to the example shown in FIG. 5, occasions 200 are shown for power saving signal monitoring. BWP1 has power saving signal configured. BWP2 is active for PDCCH monitoring according to the search space configuration, but the active BWP is changed from BWP2 to BWP1 due to a certain event, such as due to a PDCCH trigger or a DRX inactivity-timer or a bwp-InactivityTimer for example. The UE is configured to determine if it has missed (or will miss) at least one power saving signal monitoring occasion 200 because of this change from BWP2 to BWP1. Based upon this determination, the UE may be configured to monitor PDCCH on the current BWP1 on the on-Duration (DRX ON) as illustrated by 202. The UE may be configured to determine that it misses, or will miss, at least one power saving signal if the UE enters BWP1 at the time the PDCCH monitoring occasion has just passed and before the next on-Duration.

Figure 6:
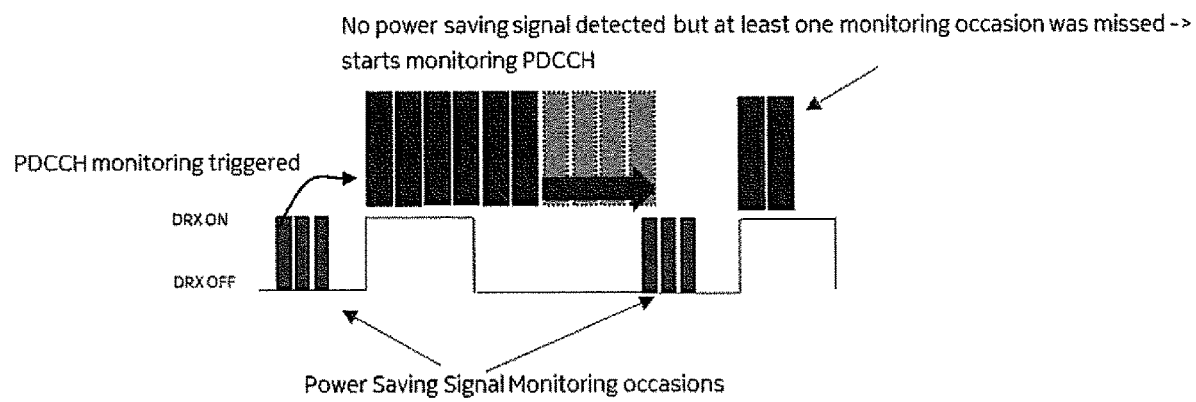
FIG. 6 shows further power saving monitoring occasions.

In further aspects, in the above case or if the power saving signal is monitored on a same BWP (on a same BWP as where the PDCCH monitoring would be performed), when the UE enters DRX on the same slot of (or during) the power saving signal/channel monitoring occasion/occasions, so that at least one power saving signal/channel monitoring occasion was missed, as illustrated in FIG. 6 it may consider:

that the wake-up signal to have been transmitted and monitors the PDCCH in the next ON-duration (corresponding to the missed power saving signal/channel monitoring occasion). In additional embodiments, as shown in FIG. 6 for example, the on-duration 206 may be shorter than the normal on-duration 208, to reduce the power consumption. This may include:

For the half of the duration starting from the first slot of the On-duration

N-slots from the beginning of the next on-duration (duration of N-slots may be equal or less than On-Duration)
  i. Where N can be configured by network So that at least every search space/CORESET has been monitored at least once
  i. Or alternatively selected/configured search space occasions/CORESET have been monitored at least once (or number of time determined by network)

if UE misses at least one monitoring occasion (slot) of a Wake up signal reception window/monitoring window the UE may consider the wake-up signal to have been transmitted and the UE may monitor the PDCCH in the next (one or two or three, etc) ON-duration(s)
  i. Alternatively, the UE may consider the wake-up signal to have NOT been transmitted, and the UE may skip monitoring the PDCCH in the next/current ON-duration.

Figure 7:
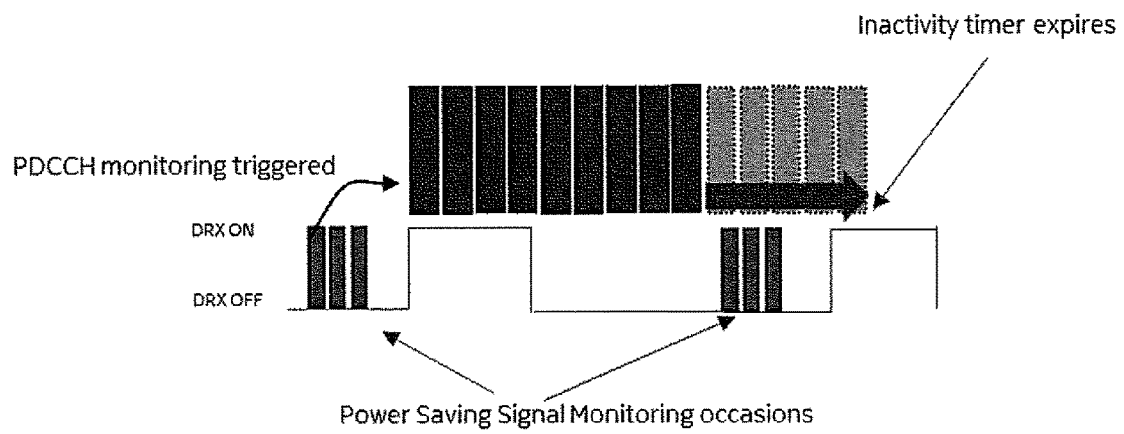
FIG. 7 shows still further power saving monitoring occasions.

Referring also to FIG. 7, in yet another example embodiment, when the inactivity timer expires during the next or any subsequent ON-duration (after UE wake up has been triggered) as shown by 210, the UE may monitor PDCCH for the current ON-duration. Alternatively, when the inactivity timer expires during the next or any subsequent ON-duration, and if the UE has been configured to report periodic CSI feedback on the ON-duration, the UE may monitor PDCCH for the current ON-duration. If the UE is not configured to provide CSI feedback during the ON-duration, the UE does not monitor PDCCH according to search space configuration.

In any of the example embodiments described herein, detecting the wake-up signal may trigger the UE to enter an active time (which may include monitoring PDCCH).

Additionally, or alternatively, in any of the example embodiments described herein, the wake-up signal may be transmitted before an on-duration or during an on-duration. When the wake-up signal is detected before the on-duration (e.g. a monitoring window is configured to be prior to an on-duration) the wake-up signal may cause the UE to at least monitor PDCCH on the next on-duration. The monitoring window (or monitoring occasions) may also be partly overlapping or fully overlapping with an on-duration and when a wake-up signal is detected, it may also apply for a current on-duration (UE is triggered to monitor PDCCH/enter active time).

In one further embodiment, if the UE receives a wake-up signal when it is currently on active time, the UE may decode PDCCH (or stay in active time) until the end of the next on-duration; regardless of the inactivity timer. Alternatively, the UE may wake up in the next on-duration even if no wake-up signal on the next monitoring occasion is received.

In one embodiment, detecting a wake-up signal during monitoring occasion/window would control UE PDCCH monitoring each on-duration between monitoring windows. As an example, if there would be N on-durations between two monitoring windows (or monitoring occasions) a wake-up signal would trigger UE to enter active time (e.g. at least monitor PDCCH) on the N on-durations between the monitoring windows.

In any of the embodiments herein, there may be a one-to-one mapping of wake-up signal monitoring window/occasion and a subsequent on-duration such as, for example, when a wake-up signal is detected it applies for the next on-duration. Alternatively, there may be a one-to-many mapping of wake-up signal monitoring window and N subsequent on-durations. In the one-to-many case, if the UE misses at least one monitoring occasion, it may monitor the corresponding N on-durations. Alternatively, in case a many-to-one mapping are present before the corresponding on-duration, and the UE missed or will miss at least one monitoring occasion, it may wake-up for the next (corresponding) on-duration. A many-to-one mapping may comprise multiple monitoring windows for example. With multiple monitoring windows, there may be more than one separate monitoring occasions sets. Alternatively, a monitoring window may comprise, for example, whole DRX off-duration (or non on-duration) portion of the DRX cycle where one or more monitoring occasions may be spaced apart in time determined by a search space configuration (the network may configure the search space for the power saving signal to have longer periodicity if the search space is configured for wake up signal monitoring).

Other additional example features may be provide including:
  UE receives configuration of multiple BWPs
  UE receives CORESET and search space set configuration(s) for monitoring PDCCH based power saving signal on the first BWP
  When operating on the second BWP UE receives signaling or BWP inactivity time expires to trigger UE to switch to the first BWP When the first BWP is active UE determines that the current slot is between the start of the set of PDCCH monitoring occasions for WUS signal and the UE monitors PDCCH on the next on-Duration on the current BWP.

With features as described herein ambiguity, whether a power saving signal was transmitted and the UE was not able to receive it or if the specific monitoring occasion was overlapped with other UE activities, may be removed. This provides a means for the network and the UE to stay synchronized.

In accordance with one example, a method is provided comprising: determining by a user equipment that the user equipment has missed, or will miss, at least one power saving signal monitoring occasion, where the user equipment is configured to monitor a power saving signal in a first bandwidth part; and based upon the determination that the user equipment has missed, or will miss, the at least one power saving signal monitoring occasion, causing the user equipment to monitor a physical downlink control channel on the first bandwidth part during an on-duration of discontinuous reception-cycle.

The method may further comprise, based upon the causing of the user equipment to monitor a physical downlink control channel on the first bandwidth part during the on-duration of discontinuous reception-cycle, causing the on-duration of discontinuous reception-cycle to be reduced. The method may further comprise, before causing the user equipment to monitor the physical downlink control channel on the first bandwidth part during the on-duration of discontinuous reception-cycle, the user equipment monitoring the physical downlink control channel on a second bandwidth part, and switching the monitoring of the physical downlink control channel from the second bandwidth part to the first bandwidth part based upon: a physical downlink control channel trigger, or a discontinuous reception inactivity-timer, or a bandwidth part inactivity timer. The method may further comprise, the user equipment being caused to monitor the physical downlink control channel on the first bandwidth part during the on-duration of discontinuous reception-cycle based, at least partially, upon the switching of the monitoring of the physical downlink control channel from the second bandwidth part to the first bandwidth part, and/or where monitoring the power saving signal comprises monitoring of a downlink control information format with at least one of a Cell Radio Network Temporary Identifier, a Radio Network Temporary Identifier for power saving, or a group common Radio Network Temporary Identifier for power saving.

In accordance with an example embodiment, an apparatus may be provided comprising: at least one processor; and at least one non-transitory memory including computer program code, the at least one memory and the computer program code configured to, with the at least one processor, cause the apparatus to: determine by the apparatus that the apparatus has missed, or will miss, at least one power saving signal monitoring occasion, where the apparatus is configured to monitor a power saving signal in a first bandwidth part; and based upon the determination that the apparatus has missed, or will miss, the at least one power saving signal monitoring occasion, cause the apparatus to monitor a physical downlink control channel on the first bandwidth part during an on-duration of discontinuous reception-cycle.

The apparatus may be configured to: based upon the causing of the apparatus to monitor a physical downlink control channel on the first bandwidth part during the on-duration of discontinuous reception-cycle, cause the on-duration of discontinuous reception-cycle to be reduced. The apparatus may be configured to: before causing the apparatus to monitor the physical downlink control channel on the first bandwidth part during the on-duration of discontinuous reception-cycle, cause monitoring of the physical downlink control channel on a second bandwidth part, and switching the monitoring of the physical downlink control channel from the second bandwidth part to the first bandwidth part based upon: a physical downlink control channel trigger, or a discontinuous reception inactivity-timer, or a bandwidth part inactivity timer. The apparatus may be configured to: monitor the physical downlink control channel on the first bandwidth part during the on-duration of discontinuous reception-cycle based, at least partially, upon the switching of the monitoring of the physical downlink control channel from the second bandwidth part to the first bandwidth part, and/or where monitoring the power saving signal comprises monitoring of a downlink control information format with at least one of a Cell Radio Network Temporary Identifier, a Radio Network Temporary Identifier for power saving, or a group common Radio Network Temporary Identifier for power saving.

An example embodiment may be provided with a non-transitory program storage device readable by a machine, tangibly embodying a program of instructions executable by the machine for performing operations, the operations comprising: determining by a user equipment that the user equipment has missed, or will miss, at least one power saving signal monitoring occasion, where the user equipment is configured to monitor a power saving signal in a first bandwidth part; and based upon the determination that the user equipment has missed, or will miss, the at least one power saving signal monitoring occasion, causing the user equipment to monitor a physical downlink control channel on the first bandwidth part during an on-duration of discontinuous reception-cycle. The operations may further comprise, based upon the causing of the user equipment to monitor a physical downlink control channel on the first bandwidth part during the on-duration of discontinuous reception-cycle, causing the on-duration of discontinuous reception-cycle to be reduced. The operations may further comprise, before causing the user equipment to monitor the physical downlink control channel on the first bandwidth part during the on-duration of discontinuous reception-cycle, the user equipment monitoring the physical downlink control channel on a second bandwidth part, and switching the monitoring of the physical downlink control channel from the second bandwidth part to the first bandwidth part based upon: a physical downlink control channel trigger, or a discontinuous reception inactivity-timer, or a bandwidth part inactivity timer. The operations may further comprise, the user equipment is caused to monitor the physical downlink control channel on the first bandwidth part during the on-duration of discontinuous reception-cycle based, at least partially, upon the switching of the monitoring of the physical downlink control channel from the second bandwidth part to the first bandwidth part, and/or where monitoring the power saving signal comprises monitoring of a downlink control information format with at least one of a Cell Radio Network Temporary Identifier, a Radio Network Temporary Identifier for power saving, or a group common Radio Network Temporary Identifier for power saving.

An example embodiment may be provided with an apparatus comprising: means for determining by the apparatus that the apparatus has missed, or will miss, at least one power saving signal monitoring occasion, where the apparatus is configured to monitor a power saving signal in a first bandwidth part; and based upon the determination that the apparatus has missed, or will miss, the at least one power saving signal monitoring occasion, means for causing the apparatus to monitor a physical downlink control channel on the first bandwidth part during an on-duration of discontinuous reception-cycle. The apparatus may further comprise means for causing the on-duration of discontinuous reception-cycle to be reduced, based upon the causing of the apparatus to monitor a physical downlink control channel on the first bandwidth part during the on-duration of discontinuous reception-cycle. The apparatus may further comprise means for causing the apparatus to monitor the physical downlink control channel on a second bandwidth part, and switching the monitoring of the physical downlink control channel from the second bandwidth part to the first bandwidth part, before causing the apparatus to monitor the physical downlink control channel on the first bandwidth part during the on-duration of discontinuous reception-cycle, based upon: a physical downlink control channel trigger, or a discontinuous reception inactivity-timer, or a bandwidth part inactivity timer. The apparatus may further comprise means for causing monitoring of the physical downlink control channel on the first bandwidth part during the on-duration of discontinuous reception-cycle based, at least partially, upon the switching of the monitoring of the physical downlink control channel from the second bandwidth part to the first bandwidth part.

An example method may be provided comprising: configuring a user equipment to monitor a power saving signal in a first bandwidth part; causing the user equipment to monitor a physical downlink control channel on the first bandwidth part during an on-duration of discontinuous reception-cycle; and based upon the causing of the user equipment to monitor the physical downlink control channel on the first bandwidth part during the on-duration of discontinuous reception-cycle, causing the on-duration of discontinuous reception-cycle to be reduced relative to a previous on-duration of discontinuous reception-cycle.

An example embodiment may be provide with an apparatus comprising: at least one processor; and at least one non-transitory memory including computer program code, the at least one memory and the computer program code configured to, with the at least one processor, cause the apparatus to: configure the apparatus to monitor a power saving signal in a first bandwidth part; cause the apparatus to monitor a physical downlink control channel on the first bandwidth part during an on-duration of discontinuous reception-cycle; and based upon the causing of the apparatus to monitor the physical downlink control channel on the first bandwidth part during the on-duration of discontinuous reception-cycle, cause the on-duration of discontinuous reception-cycle to be reduced relative to a previous on-duration of discontinuous reception-cycle.

An example embodiment may be provided with a non-transitory program storage device readable by a machine, tangibly embodying a program of instructions executable by the machine for performing operations, the operations comprising: configuring a user equipment to monitor a power saving signal in a first bandwidth part; causing the user equipment to monitor a physical downlink control channel on the first bandwidth part during an on-duration of discontinuous reception-cycle; and based upon the causing of the user equipment to monitor the physical downlink control channel on the first bandwidth part during the on-duration of discontinuous reception-cycle, causing the on-duration of discontinuous reception-cycle to be reduced relative to a previous on-duration of discontinuous reception-cycle.

An example embodiment may be provide with an apparatus comprising: means for configuring the apparatus to monitor a power saving signal in a first bandwidth part; means for causing the apparatus to monitor a physical downlink control channel on the first bandwidth part during an on-duration of discontinuous reception-cycle; and, based upon the causing of the apparatus to monitor the physical downlink control channel on the first bandwidth part during the on-duration of discontinuous reception-cycle, means for causing the on-duration of discontinuous reception-cycle to be reduced relative to a previous discontinuous reception On period.

An example method may be provide comprising: determining by a user equipment that an inactivity timer has expired during an on-duration of discontinuous reception-cycle after a user equipment wake up has been triggered, where the user equipment is configured to report periodic channel status information (CSI) feedback on the on-duration of discontinuous reception-cycle; and, based upon the determination that the inactivity timer has expired during the on-duration of discontinuous reception-cycle after the user equipment wake up has been triggered, causing the user equipment to monitor a physical downlink control channel for the on-duration of discontinuous reception-cycle.

An example embodiment may be provided with an apparatus comprising: at least one processor; and at least one non-transitory memory including computer program code, the at least one memory and the computer program code configured to, with the at least one processor, cause the apparatus to: determine by the apparatus that an inactivity timer has expired during an on-duration of discontinuous reception-cycle after an apparatus wake up has been triggered, where the apparatus is configured to report periodic channel status information (CSI) feedback on the on-duration of discontinuous reception-cycle; and based upon the determination that the inactivity timer has expired during the on-duration of discontinuous reception-cycle after the apparatus wake up has been triggered, cause the apparatus to monitor a physical downlink control channel for the on-duration of discontinuous reception-cycle.

An example embodiment may be provide with a non-transitory program storage device readable by a machine, tangibly embodying a program of instructions executable by the machine for performing operations, the operations comprising: determining by a user equipment that an inactivity timer has expired during an on-duration of discontinuous reception-cycle after a user equipment wake up has been triggered, where the user equipment is configured to report periodic channel status information (CSI) feedback on the on-duration of discontinuous reception-cycle; and based upon the determination that the inactivity timer has expired during the on-duration of discontinuous reception-cycle after a user equipment wake up has been triggered, causing the user equipment to monitor a physical downlink control channel for the on-duration of discontinuous reception-cycle.

An example embodiment may be provided with an apparatus comprising: means for determining by the apparatus that an inactivity timer has expired during an on-duration of discontinuous reception-cycle after an apparatus wake up has been triggered, where the apparatus is configured to report periodic channel status information (CSI) feedback on the on-duration of discontinuous reception-cycle; and based upon the determination that the inactivity timer has expired during the on-duration of discontinuous reception-cycle after the user equipment wake up has been triggered, means for causing the apparatus to monitor a physical downlink control channel for the on-duration of discontinuous reception-cycle.

FIG. 8 illustrates operations which may be performed by a network device such as, the UE 110 and/or the RAN node 170 as in FIG. 1. As shown in step 810 of FIG. 8 there is determining by a user equipment that the user equipment has missed, or will miss, at least one power saving signal monitoring occasion, where the user equipment is configured to monitor a power saving signal in a first bandwidth part. Then as shown in step 820 of FIG. 8 there is based upon the determination that the user equipment has missed, or will miss, the at least one power saving signal monitoring occasion, causing the user equipment to monitor a physical downlink control channel on the first bandwidth part during an on-duration of discontinuous reception-cycle.

In accordance with the example embodiments as described in the paragraph above, there is based upon the causing of the user equipment to monitor a physical downlink control channel on the first bandwidth part during the on-duration of discontinuous reception-cycle causing the on-duration of discontinuous reception-cycle to be reduced.

In accordance with the example embodiments as described in the paragraphs above, there is; there is before causing the user equipment to monitor the physical downlink control channel on the first bandwidth part during the on-duration of discontinuous reception-cycle, the user equipment monitoring the physical downlink control channel on a second bandwidth part, and switching the monitoring of the physical downlink control channel from the second bandwidth part to the first bandwidth part based upon: a physical downlink control channel trigger, or a discontinuous reception inactivity-timer, or a bandwidth part inactivity timer.

In accordance with the example embodiments as described in the paragraphs above, where the user equipment is caused to monitor the physical downlink control channel on the first bandwidth part during the on-duration of discontinuous reception-cycle based, at least partially, upon the switching of the monitoring of the physical downlink control channel from the second bandwidth part to the first bandwidth part.

In accordance with the example embodiments as described in the paragraphs above, where monitoring the power saving signal comprises monitoring at least one of a Cell Radio Network Temporary Identifier, a Radio Network Temporary Identifier for power saving, or a group common Radio Network Temporary Identifier for power saving.

In accordance with the example embodiments as described in the paragraphs above, where monitoring the power saving signal comprises monitoring of a downlink control information format with at least one of a Cell Radio Network Temporary Identifier, a Radio Network Temporary Identifier for power saving, or a group common Radio Network Temporary Identifier for power saving.

A non-transitory computer-readable medium (Memory(ies) 125 and/or Memory(ies) 155 as in FIG. 1)) storing program code (Computer Program Code 123, Module 140-2, Computer Program Code 153, and/or Module 150-2 as in FIG. 1), the program code executed by at least one processor (Processor(s) 120, Module 140-1, Processor(s) 152, and/or Module 150-1 as in FIG. 1) to perform the operations as at least described in the paragraphs above.

In accordance with an example embodiment of the invention as described above there is an apparatus comprising: means for determining (Memory(ies) 125 and/or Memory(ies) 155, Computer Program Code 123, Module 140-2, Computer Program Code 153, and/or Module 150-2, and Processor(s) 120, Module 140-1, Processor(s) 152, and/or Module 150-1 as in FIG. 1) by a user equipment (UE 110 and/or RAN Node 170) that the user equipment has missed, or will miss, at least one power saving signal monitoring occasion, where the user equipment is configured to monitor (Memory(ies) 125 and/or Memory(ies) 155, Computer Program Code 123, Module 140-2, Computer Program Code 153, and/or Module 150-2, and Processor(s) 120, Module 140-1, Processor(s) 152, and/or Module 150-1 as in FIG. 1) a power saving signal in a first bandwidth part. Then as shown in step 820 of FIG. 8 there is based upon the determination (Memory(ies) 125 and/or Memory(ies) 155, Computer Program Code 123, Module 140-2, Computer Program Code 153, and/or Module 150-2, and Processor(s) 120, Module 140-1, Processor(s) 152, and/or Module 150-1 as in FIG. 1) that the user equipment has missed, or will miss, the at least one power saving signal monitoring occasion, causing ( ) the user equipment to monitor a physical downlink control channel on the first bandwidth part during an on-duration of discontinuous reception-cycle.

FIG. 9 illustrates operations which may be performed by a network device such as, the UE 110 and/or the RAN node 170 as in FIG. 1. As shown in step 910 of FIG. 9 there is configuring a user equipment to monitor a power saving signal in a first bandwidth part. As shown in step 920 of FIG. 9 there is causing the user equipment to monitor a physical downlink control channel on the first bandwidth part during an on-duration of discontinuous reception-cycle. Then as shown in step 930 of FIG. 9 there is based upon the causing of the user equipment to monitor the physical downlink control channel on the first bandwidth part during the on-duration of discontinuous reception-cycle, causing the on-duration of discontinuous reception-cycle to be reduced relative to a previous on-duration of discontinuous reception-cycle.

FIG. 10 illustrates operations which may be performed by a network device such as, the UE 110 and/or the RAN node 170 as in FIG. 1. As shown in step 1010 of FIG. 10 there is determining by a user equipment that an inactivity timer has expired during an on-duration of discontinuous reception-cycle after a user equipment wake up has been triggered, where the user equipment is configured to report periodic channel status information (CSI) feedback on the on-duration of discontinuous reception-cycle. Then as shown in step 1020 of FIG. 10 there is based upon the determination that the inactivity timer has expired during the on-duration of discontinuous reception-cycle after the user equipment wake up has been triggered, causing the user equipment to monitor a physical downlink control channel for the on-duration of discontinuous reception.

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

It should be understood that the description herein may be only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

In accordance with example embodiments of the invention as disclosed in this application this application, the "circuitry" provided can include at least one or more or all of the following:
  (a) hardware-only circuit implementations (such as implementations in only analog and/or digital circuitry);
  (b) combinations of hardware circuits and software, such as (as applicable):
    (i) a combination of analog and/or digital hardware circuit(s) with software/firmware; and
    (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
  (c) hardware circuit(s) and or processor(s), such as a microprocessor(s) or a portion of a microprocessor(s), that requires software (e.g., firmware) for operation, but the software may not be present when it is not needed for operation."

As used in this application, the term 'circuitry' refers to all of the following:
(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is may be used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:
1. A method comprising:
   determining by a user equipment that the user equipment has missed, or will miss, at least one power saving signal monitoring occasion, where the user equipment is configured to monitor a power saving signal in a first bandwidth part; and
   based upon the determination that the user equipment has missed, or will miss, the at least one power saving signal monitoring occasion, causing the user equipment to monitor a physical downlink control channel on the first bandwidth part during an on-duration of discontinuous reception-cycle.

2. A method as in claim 1, further comprising, monitoring the physical downlink control channel during at least one of a:
corresponding or next or subsequent on-duration of discontinuous reception-cycle or
the corresponding/subsequent N on-durations.

3. A method as in claim 1, further comprising, based upon the causing of the user equipment to monitor a physical downlink control channel on the first bandwidth part during the on-duration of discontinuous reception-cycle, causing the on-duration of discontinuous reception-cycle to be reduced.

4. A method as in claim 1, further comprising, before causing the user equipment to monitor the physical downlink control channel on the first bandwidth part during the on-duration of discontinuous reception, the user equipment monitoring the physical downlink control channel on a second bandwidth part, and switching the monitoring of the physical downlink control channel from the second bandwidth part to the first bandwidth part based upon:
a physical downlink control channel trigger, or
a discontinuous reception inactivity-timer, or
a bandwidth part inactivity timer.

5. A method as in claim 4, where the user equipment is caused to monitor the physical downlink control channel on the first bandwidth part during the on-duration of the discontinuous reception cycle based, at least partially, upon the switching of the monitoring of the physical downlink control channel from the second bandwidth part to the first bandwidth part.

6. The method as in claim 1, where the user equipment is caused to monitor the physical downlink control channel on the first bandwidth part during the on duration of discontinuous reception cycle based on the discontinuous reception inactivity-timer.

7. The method of claim 1, where monitoring the power saving signal comprises monitoring of a downlink control information format with at least one of a Cell Radio Network Temporary Identifier, a Radio Network Temporary Identifier for power saving, or a group common Radio Network Temporary Identifier for power saving.

8. An apparatus comprising:
at least one processor; and
at least one non-transitory memory including computer program code, the at least one memory and the computer program code configured to, with the at least one processor, cause the apparatus to:
determine by the apparatus that the apparatus has missed, or will miss, at least one power saving signal monitoring occasion, where the apparatus is configured to monitor a power saving signal in a first bandwidth part; and
based upon the determination that the apparatus has missed, or will miss, the at least one power saving signal monitoring occasion, cause the apparatus to monitor a physical downlink control channel on the first bandwidth part during an on-duration of discontinuous reception.

9. The apparatus as in claim 8, where the at least one memory and the computer program code are configured to, with the at least one processor, cause the apparatus to: monitor the physical downlink control channel during at least one of a:
corresponding or next or subsequent on-duration of discontinuous reception-cycle or
the corresponding/subsequent N on-durations.

10. The apparatus as in claim 8, where the at least one memory and the computer program code are configured to, with the at least one processor, cause the apparatus to: based upon the causing of the apparatus to monitor a physical downlink control channel on the first bandwidth part during the on-duration of discontinuous reception, cause the on-duration of discontinuous reception-cycle to be reduced.

11. The apparatus as in claim 8, where the at least one memory and the computer program code are configured to, with the at least one processor, cause the apparatus to:
before causing the apparatus to monitor the physical downlink control channel on the first bandwidth part during the on-duration of discontinuous reception, the apparatus monitoring the physical downlink control channel on a second bandwidth part, and switching the monitoring of the physical downlink control channel from the second bandwidth part to the first bandwidth part based upon:
a physical downlink control channel trigger, or
a discontinuous reception inactivity-timer, or
a bandwidth part inactivity timer.

12. The apparatus as in claim 11, where the at least one memory and the computer program code are configured to, with the at least one processor, cause the apparatus to: monitor the physical downlink control channel on the first bandwidth part during the on-duration of discontinuous reception-cycle based, at least partially, upon the switching of the monitoring of the physical downlink control channel from the second bandwidth part to the first bandwidth part.

13. The apparatus as claimed in claim 8, where monitoring the power saving signal comprises monitoring of a downlink control information format with at least one of a Cell Radio Network Temporary Identifier, a Radio Network Temporary Identifier for power saving, or a group common Radio Network Temporary Identifier for power saving.

14. A non-transitory program storage device readable by a machine, tangibly embodying a program of instructions executable by the machine for performing operations, the operations comprising:
determining by a user equipment that the user equipment has missed, or will miss, at least one power saving signal monitoring occasion, where the user equipment is configured to monitor a power saving signal in a first bandwidth part; and
based upon the determination that the user equipment has missed, or will miss, the at least one power saving signal monitoring occasion, causing the user equipment to monitor a physical downlink control channel on the first bandwidth part during an on-duration of discontinuous reception.

15. The non-transitory program storage device as in claim 14, the operations further comprising, monitoring the physical downlink control channel during at least one of a:
corresponding or next or subsequent on-duration of discontinuous reception-cycle or
the corresponding/subsequent N on-durations.

16. The non-transitory program storage device as in claim 14, where the operations further comprise, based upon the causing of the user equipment to monitor a physical downlink control channel on the first bandwidth part during the on-duration of discontinuous reception-cycle causing the on-duration of discontinuous reception-cycle to be reduced.

17. The non-transitory program storage device as in claim 14, where the operations further comprise, before causing the user equipment to monitor the physical downlink control channel on the first bandwidth part during the on-duration of discontinuous reception, the user equipment monitoring the physical downlink control channel on a second bandwidth part, and switching the monitoring of the physical downlink control channel from the second bandwidth part to the first bandwidth part based upon:
a physical downlink control channel trigger, or
a discontinuous reception inactivity-timer, or
a bandwidth part inactivity timer.

18. The non-transitory program storage device as in claim 17, where the operations further comprise, the user equipment is caused to monitor the physical downlink control channel on the first bandwidth part during the on-duration of discontinuous reception-cycle based, at least partially, upon the switching of the monitoring of the physical downlink control channel from the second bandwidth part to the first bandwidth part.

19. The non-transitory program storage device as in claim 14, where monitoring the power saving signal comprises monitoring of a downlink control information format with at least one of a Cell Radio Network Temporary Identifier, a Radio Network Temporary Identifier for power saving, or a group common Radio Network Temporary Identifier for power saving.

20. A method comprising:
configuring a user equipment to monitor a power saving signal in a first bandwidth part;
causing the user equipment to monitor a physical downlink control channel on the first bandwidth part during an on-duration of discontinuous reception; and
based upon the causing of the user equipment to monitor the physical downlink control channel on the first bandwidth part during the on-duration of discontinuous reception, causing the on-duration of discontinuous reception-cycle to be reduced relative to a previous on-duration of discontinuous reception.

21. An apparatus comprising:
at least one processor; and
at least one non-transitory memory including computer program code, the at least one memory and the computer program code configured to, with the at least one processor, cause the apparatus to:
configure the apparatus to monitor a power saving signal in a first bandwidth part;
cause the apparatus to monitor a physical downlink control channel on the first bandwidth part during an on-duration of discontinuous reception; and
based upon the causing of the apparatus to monitor the physical downlink control channel on the first bandwidth part during the on-duration of discontinuous reception, cause the discontinuous reception On period to be reduced relative to a previous on-duration of discontinuous reception.

22. A non-transitory program storage device readable by a machine, tangibly embodying a program of instructions executable by the machine for performing operations, the operations comprising:
configuring a user equipment to monitor a power saving signal in a first bandwidth part;
causing the user equipment to monitor a physical downlink control channel on the first bandwidth part during an on-duration of discontinuous reception; and
based upon the causing of the user equipment to monitor the physical downlink control channel on the first bandwidth part during the on-duration of discontinuous reception, causing the on-duration of discontinuous reception-cycle to be reduced relative to a previous on-duration of discontinuous reception.

23. A method comprising:
determining by a user equipment that an inactivity timer has expired during an on duration of discontinuous reception-cycle after a user equipment wake up has been triggered, where the user equipment is configured to report periodic channel status information (CSI) feedback on the on-duration of discontinuous reception; and
based upon the determination that the inactivity timer has expired during the on-duration of discontinuous reception-cycle after the user equipment wake up has been triggered, causing the user equipment to monitor a physical downlink control channel for the on-duration of discontinuous reception.

24. An apparatus comprising:
at least one processor; and
at least one non-transitory memory including computer program code, the at least one memory and the computer program code configured to, with the at least one processor, cause the apparatus to:
determine by the apparatus that an inactivity timer has expired during an on-duration of discontinuous reception-cycle after an apparatus wake up has been triggered, where the apparatus is configured to report periodic channel status information (CSI) feedback on the on-duration of discontinuous reception; and
based upon the determination that the inactivity timer has expired during the on-duration of discontinuous reception-cycle after the apparatus wake up has been triggered, cause the apparatus to monitor a physical downlink control channel for the on-duration of discontinuous reception.

25. A non-transitory program storage device readable by a machine, tangibly embodying a program of instructions executable by the machine for performing operations, the operations comprising:
determining by a user equipment that an inactivity timer has expired during an on-duration of discontinuous reception-cycle after a user equipment wake up has been triggered, where the user equipment is configured to report periodic channel status information (CSI) feedback on the on-duration of discontinuous reception; and
based upon the determination that the inactivity timer has expired during the on-duration of discontinuous reception-cycle after a user equipment wake up has been triggered, causing the user equipment to monitor a physical downlink control channel for the on-duration of discontinuous reception.

* * * * *